United States Patent
Wu et al.

(10) Patent No.: US 8,150,106 B2
(45) Date of Patent: Apr. 3, 2012

(54) PRINTER CHARACTERIZATION, MONITORING AND DIAGNOSIS USING DYNAMIC TEST PATTERNS GENERATED BY SENSING AND ANALYZING CUSTOMER DOCUMENTS

(75) Inventors: Wencheng Wu, Webster, NY (US); Rajinderjeet Minhas, Churchville, NY (US); Meera Sampath, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1008 days.

(21) Appl. No.: 12/112,293

(22) Filed: Apr. 30, 2008

(65) Prior Publication Data

US 2009/0274342 A1 Nov. 5, 2009

(51) Int. Cl.
G06K 9/00 (2006.01)
H04N 1/46 (2006.01)
(52) U.S. Cl. .................. 382/112; 382/312; 358/504
(58) Field of Classification Search .................. None
See application file for complete search history.

(56) References Cited

U.S. PATENT DOCUMENTS

| | | | |
|---|---|---|---|
| 5,856,876 A * | 1/1999 | Sasanuma et al. ............ 358/300 |
| 5,978,506 A * | 11/1999 | Murayama et al. ............ 382/162 |
| 6,240,205 B1 | 5/2001 | Fan et al. |
| 6,320,668 B1 * | 11/2001 | Kim ............ 358/1.1 |
| 6,347,153 B1 | 2/2002 | Triplett et al. |
| 6,351,308 B1 * | 2/2002 | Mestha ............ 356/402 |
| 6,504,625 B1 * | 1/2003 | Amero et al. ............ 358/1.9 |
| 6,529,616 B1 | 3/2003 | Rasmussen et al. |
| 6,538,770 B1 * | 3/2003 | Mestha ............ 358/1.9 |
| 6,571,000 B1 | 5/2003 | Rasmussen et al. |
| 6,597,473 B1 | 7/2003 | Rasmussen et al. |
| 6,606,395 B1 | 8/2003 | Rasmussen et al. |
| 6,608,932 B1 | 8/2003 | Rasmussen et al. |
| 6,643,035 B1 * | 11/2003 | Salgado ............ 358/474 |
| 6,662,425 B2 | 12/2003 | Chern |
| 6,665,425 B1 * | 12/2003 | Sampath et al. ............ 382/112 |
| 6,744,531 B1 * | 6/2004 | Mestha et al. ............ 358/1.9 |
| 6,912,071 B1 | 6/2005 | Rasmussen et al. |
| 6,975,949 B2 | 12/2005 | Mestha et al. |
| 6,993,675 B2 * | 1/2006 | Roddy et al. ............ 714/2 |
| 7,382,507 B2 * | 6/2008 | Wu ............ 358/523 |
| 7,516,040 B2 * | 4/2009 | Leute et al. ............ 702/166 |
| 7,773,774 B2 * | 8/2010 | Rasmussen et al. ............ 382/112 |
| 2004/0061884 A1 * | 4/2004 | Yamaguchi ............ 358/1.9 |
| 2005/0286742 A1 * | 12/2005 | Rasmussen et al. ............ 382/112 |
| 2006/0110009 A1 | 5/2006 | Klassen et al. |
| 2006/0119877 A1 * | 6/2006 | Leute et al. ............ 358/1.14 |
| 2007/0003109 A1 * | 1/2007 | Wu et al. ............ 382/112 |
| 2007/0140571 A1 | 6/2007 | Fan et al. |
| 2008/0013848 A1 | 1/2008 | Wu et al. |
| 2010/0325487 A1 * | 12/2010 | Minhas et al. ............ 714/26 |

* cited by examiner

Primary Examiner — Manav Seth
(74) Attorney, Agent, or Firm — Pillsbury Winthrop Shaw Pitman LLP

(57) ABSTRACT

A method for automated image quality based diagnosis of a document printing system is disclosed. The method comprises receiving image data to be printed on a document; printing an image on the document based on the image data; scanning the printed image on the document with a sensor; analyzing the scanned printed image with an image quality analysis module to identify one or more defects in the printed image; automatically generating test pattern image data based on the one or more identified defects; and printing and analyzing a test pattern image based on the test pattern image data.

28 Claims, 4 Drawing Sheets

PRINTER CHARACTERIZATION, MONITORING AND DIAGNOSIS USING DYNAMIC TEST PATTERNS GENERATED BY SENSING AND ANALYZING CUSTOMER DOCUMENTS

BACKGROUND

1. Field

The present disclosure relates to a system and a method for automated image quality based diagnosis of a document printing system. In particular, the present disclosure provides a hybrid approach that uses customer documents where possible and augments the customer documents with test patterns when necessary.

2. Description of Related Art

Diagnosis of image quality (IQ) problems is a difficult task. A number of document printing systems are able to send machine state and usage information back to the manufacturer or a service center. This information can be analyzed for diagnostic and prognostic purposes by field service personnel as well as product engineers. However, this information is usually not sufficient for diagnosing image quality problems.

Customer prints and/or special test patterns have been used to analyze image quality problems manually. For example, a customer or a service personnel may visually analyze the customer print and then provide inputs to the machine diagnoser. When visually examining the customer prints, there are some difficulties associated with identifying optimal test-patterns because a human observer tends to view image content on a qualitative basis rather than a quantitative basis. For example, the customer may notice a color shift on the sky blue color, but without further measurement or analysis, it may not be clear whether the color shift is on a 20% blue or a 12% blue. Thus the customer inputs may not be very accurate in specifying an optimal test-pattern for further analyses. In another instance, for example, the customer or service personnel may notice a banding issue on a light orange background. The customer or service personnel, however, may not be able to identify the frequency or frequencies of the banding and/or the fractions of colorants that make the light orange background, where the banding issue was observed. Further, analyzing the customer prints and/or special test patterns manually is a reactive approach, in that images are analyzed only after the customer notices image quality defects or artifacts.

When a field service engineer arrives at a customer site to service an image quality related problem, he/she typically has no a priori insight into the reason for the problem. The machine data available from the machine provides very little image quality related information. Moreover, the actual process of image quality diagnostics by a field engineer is a time consuming and a wasteful process. Since there is usually no a priori information available regarding the image quality trends of a machine, it may be necessary to print a number of test patterns. This can be time consuming, costly and not very environmentally conscious or "green" (e.g., waste of paper, scanning, analyses). Existing methods (See e.g., U.S. Patent Publication Nos. 2006/0110009 and 2008/0013848; U.S. patent Publication Ser. No. 12/018,540 filed on Jan. 23, 2008 by Wencheng Wu et al. entitled "SYSTEM AND METHODS FOR DETECTING IMAGE QUALITY DEFECTS") focus on reducing some of the "waste" by sensing and analyzing customer documents. Although these methods have shown some successes, there are fundamental limitations and technology difficulties that limit their current performance. One limitation, for example, is that the customer may not print a certain colorant combination at certain spatial locations which may be critical for diagnosis and/or characterization. Another example is the strict requirement of accuracy on image registration including global and local distortion. Yet another example is that it is rare to have a large enough area of desired constant color, in order to generate accurate image quality information for diagnostics in the customer documents.

It is thus desirable to accumulate detected defects over many prints and then interpolate/extrapolate them for the purpose of diagnostics. With interpolation, it is difficult to detect certain defects accurately such as those with high spatial frequency. Thus, due to these challenges faced by technologies that sense and analyze only customer documents, there is a need to have auxiliary use of test patterns/prints. Also, while numerous proposals and some implementations of in situ monitoring have been made, the present disclosure differs in using customer documents where possible and augmenting with test patterns when necessary.

SUMMARY

One feature of the disclosure is to provide a hybrid approach in which customer documents are used where possible and are augmented with test patterns when necessary.

One embodiment of the disclosure relates to a method for automated image quality based diagnosis of a document printing system. The method includes receiving image data to be printed on a document; printing an image on the document based on the image data; scanning the printed image on the document with a sensor; analyzing the scanned printed image with an image quality analysis module to identify one or more defects in the printed image; automatically generating test pattern image data based on the one or more identified defects; and printing and analyzing a test pattern image based on the test pattern image data.

Another embodiment of the disclosure relates to a system for automated image quality based diagnosis of a document printing system. The system includes a print engine, a sensor, and an image quality analysis module. The print engine is configured to receive image data to be printed on a document, and to print an image on the document based on the image data. The sensor is configured to scan the printed image. The image quality analysis module is configured to analyze the scanned printed image to identify one or more defects on the printed image. The print engine is also configured to automatically generate test pattern image data based on the one or more identified defects, and to print and analyze a test pattern image based on the test pattern image data.

Another embodiment of the disclosure related to a system for pooling image quality data related to a plurality of document printing systems to obtain automated image quality based diagnosis. The system includes a plurality of document printing systems, a network and a manufacturer/service provider. Each document printing system includes a print engine, a sensor and an image quality analysis module. The print engine is configured to receive image data to be printed on a document, and to print an image on the document based on the image data. The sensor is configured to scan the printed image. The image quality analysis module is configured to analyze the scanned printed image to identify one or more defects on the printed image. The print engine is also configured to automatically generate test pattern image based on the one or more identified defects, and to print and analyze a test pattern image based on the test pattern image data. Image quality data is obtained from at least one document printing system by analyzing the test pattern image from at least one document printing system. The manufacturer/service provider is configured to receive the image quality data from the at least one document printing system via the network.

Other objects, features, and advantages of one or more embodiments of the present disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

The present disclosure provides a system and a method for automated image quality based diagnosis of a document printing system. The system and the method provide a hybrid approach in which customer images or documents are used to identify the image quality defects where possible and are augmented with test patterns when necessary. The customer images or documents are continuously scanned and analyzed to identify probable onset of image quality defects or artifacts, and to ascertain probably imminent image quality defects. Even though in some instances the identified image quality defects at any given point of time may be incomplete, a trend of the defects may provide clues that make up for incompleteness. The system may accumulate the identified image quality defects in the printed image or customer documents until enough information is extracted. Once the analysis using customer images or documents indicates a high probability of an image quality defect or artifact, then appropriate and relevant test patterns are automatically and dynamically generated. In other words, the analysis performed on the customer images or documents is used to generate the relevant and necessary test patterns. In one embodiment, the results obtained from sensing and analyzing the customer documents may be interpolated and/or extrapolated to specify optimal test patterns. This may be based on a judgment of what may be important for a customer (e.g., customer is printing a lot of pictures in which case banding may be more easily visible) or based on what the customer has not printed for a long time (e.g., the test pattern may include blue color if the customer did not print blue color for a long time). The present disclosure effectively reduces the number of test patterns to be printed, and improves the efficiency of the analysis on test patterns while sustaining the quality of diagnosis. This is particularly useful in the case of remote diagnosis, where transferring and storing scans of test patterns may be expensive. The system may also potentially reduce service costs by providing more detailed information about the image quality defects to a field service engineer, and by providing proactive intervention prior to image quality complaints from the customer.

Figure 1:
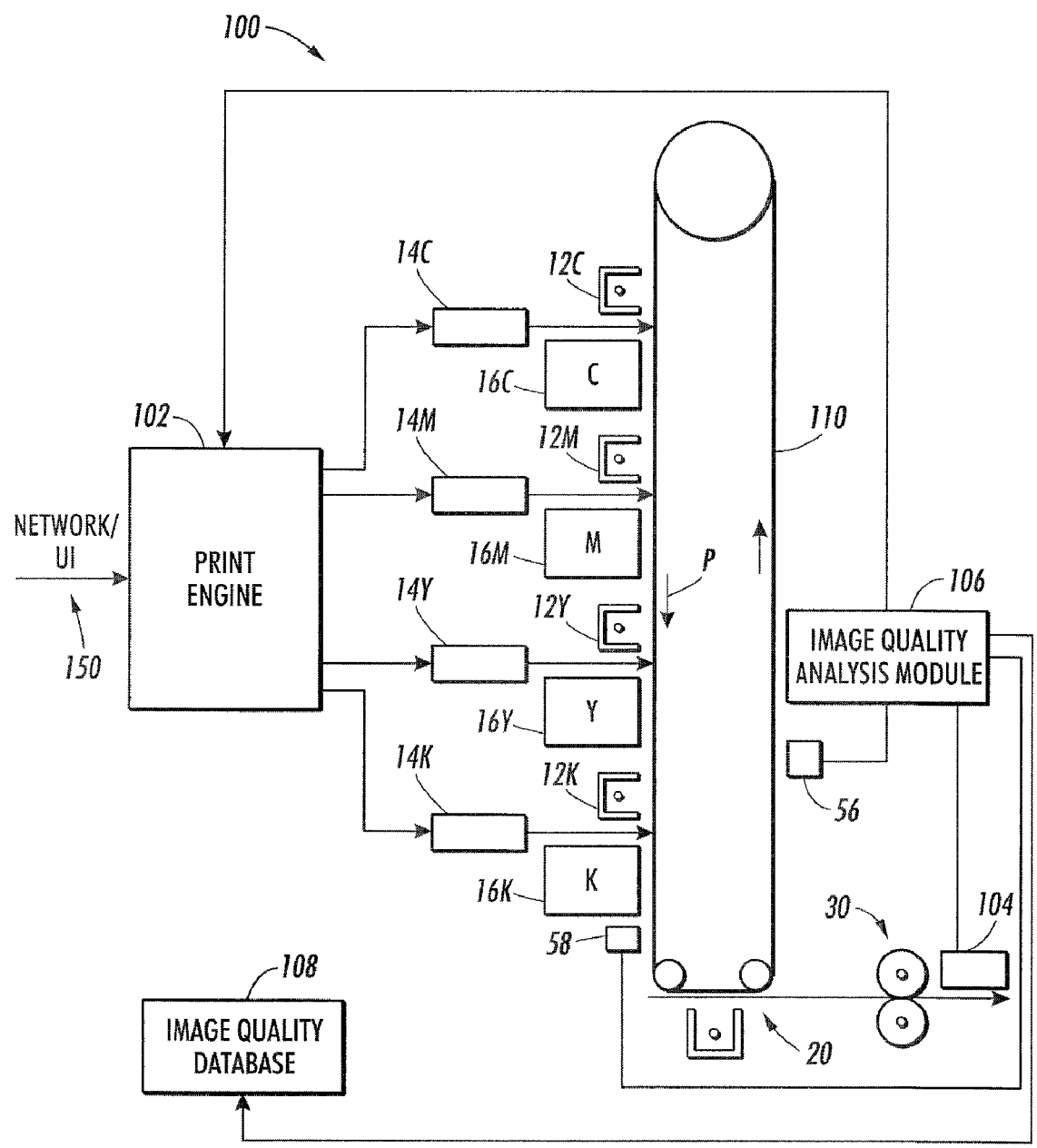
FIG. 1 shows a system for automated image quality based diagnosis of a document printing system in accordance with an embodiment of the disclosure.

FIG. 1 shows a system 100 for automated image quality based diagnosis of a document printing system. Specifically, there is shown an "image-on-image" xerographic color printer, in which successive primary-color images are accumulated on a photoreceptor belt 110, and the accumulated superimposed images are in one step directly transferred to an output document as a full-color image. In one implementation, the Xerox Corporation iGen3® digital printing press may be utilized. However, it is appreciated that any printing machine, such as monochrome machines using any technology, machines which print on photosensitive substrates, xerographic machines with multiple photoreceptors, or ink-jet-based machines, may utilize the present disclosure as well. The system may also be used in analog and digital copiers, scanners, facsimiles, or multifunction machines.

The system 100 includes a print engine 102, a sensor 104, and an image quality analysis module 106. The system 100 is configured to receive image data (e.g., from customer documents or customer images) to be printed on a document, and to print an image on the document based on the image data. The sensor 104 is configured to scan the printed image. The image quality analysis module 106 is configured to analyze the scanned printed image to identify one or more defects on the printed image. The print engine 102 is also configured to generate test pattern image data based on the one or more identified defects, and to print a test pattern image based on the test pattern image data.

In order to print the image on the document based on the image data, the print engine is configured to apply a toner image to the photoreceptor 110 based on the image data using the print engine 102, and to transfer the toner image from the photoreceptor 110 to the document to form the printed image on the document. In order to print the test pattern image based on the image data, the print engine is configured to apply a test pattern toner image to the photoreceptor 110 based on the test pattern image data using the print engine 102, and to transfer the test pattern toner image from the photoreceptor 110 to form the test pattern image. The system 100 may also include a diagnostic engine to obtain a diagnosis, and a repair module to determine repair action based on the diagnosis as will be explained in the discussions later.

Image data from customer documents or customer images may be sent to the document printing system, for example, through a network interface and/or user interface (UI) 150. In another embodiment, the image data from the customer documents or images may be sent to the document printing system through an attached scanner (i.e., a scanner attached to the print engine 102 of the document printing system). In some instances, such as a stand alone appliance or where there is no scanner available in the document printing system, a separate scanner may be used.

The image data in digital form (i.e., a data file) is accepted, stored, produced, decomposed or otherwise presented at a print controller of the document printing system. In one embodiment, the print controller that is operating in conjunction with a memory may provide operating control of the document printing system. Typically, the print controller is an external device, such as a computer or a server, which interfaces to the network 150 to accept image content and process the image content for a copier or printer devices. However, the print controller may be a part of the printing device itself. For example, the Xerox® iGen3® digital printing press incorporates a print controller. The print controller receives image data that is to be printed on a document in any one of a number of possible formats, such as, for example, TIFF, JPEG, or Adobe® PostScript™. The image data is then "interpreted" or "decomposed" in a known manner into a format usable by the copier or printer devices.

In one embodiment, the print controller may identify the objects types and their locations on the customer documents that will be printed. The object types and their locations on the customer documents can be identified by the print controller using image analysis software. For example, algorithms that identify the image content types of a document are disclosed in U.S. Pat. Nos. 6,240,205 B1; and 6,347,153 B1, and U.S. Patent Application Publication No. 2007/0140571 A1, herein incorporated by reference, in their entirety.

The print engine 102 is configured to apply a toner image to the photoreceptor belt 110 based on the image data received from the document to be printed. A series of stations are disposed along the photoreceptor belt 110, as is generally familiar in the art of xerography, where one set of stations is used for each primary color to be printed.

For example, to place a cyan color separation image on photoreceptor 110, there is used a charge corotron 12C, an imaging laser 14C, and a development unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of photoreceptor 110, and then toner image (e.g., based on the image data received to be printed on the document) is transferred from the photoreceptor 110 (e.g., at transfer station 20) to the document to form a printed image on the document. The output document is then run through a fuser 30, as is familiar in xerography.

The system 100 includes sensors 56, 58, and 104 that are configured to provide feedback to the image analysis module 106. The sensors 56, 58 and 104 are configured to scan images created on the photoreceptor 110 and/or to scan test patterns (e.g., sensors 56 and 58), or to scan the printed image on the document (e.g., sensor 104). In an embodiment, the sensors 56 and 58 may be placed just before or just after the transfer station 20 where the toner is transferred to the document. In another embodiment, the sensor 104 may be placed to sense the printed document directly as the printed document comes out of the document printing machine. The sensors 56 and 58 may be in the form of optical densitometers, calorimeters, electrostatic voltmeters, etc. It should be appreciated that any number of sensors may be provided, and may be placed anywhere in the document printing system as needed, not just in the locations illustrated.

The system 100 periodically and automatically scans the printed image on the document preferably using the linear array sensor 104 (e.g., a full width array sensor). A full width array (FWA) sensor is defined as a sensor that extends substantially an entire width (perpendicular to a direction of motion) of the moving image bearing surface (e.g., the printed document or photoreceptor belt 110). The full width array sensor is configured to detect any desired part of the printed image. The full width array sensor may include a plurality of sensors equally spaced at intervals (e.g., every 1/600th inch (600 spots per inch)) in the cross-process (or fast scan) direction. See for example, U.S. Pat. No. 6,975,949, incorporated herein by reference. It is understood that other linear array sensors may also be used, such as contact image sensors, CMOS array sensors or CCD array sensors. The linear sensor array 104 is advantageously much more sensitive than the human eye and may discern non-uniformities and defects well before a person (i.e. the customer) may be capable of doing so.

As noted earlier, the system 100 includes the image quality analysis module 106 that analyzes the scanned printed image to identify one or more defects in the printed image. In one embodiment, the image quality analysis module 106 may characterize defects in terms of quantitative parameters and generate key features of the defects for further analysis. In one embodiment, the image quality analysis module 106 may include a computer, or program operating on a computer, capable of conducting image analysis by processing the scanned printed image to characterize defects or failure modes in terms of quantitative parameters. The image quality analysis module 106 analyzes the scanned printed image using image analysis or processing techniques known in the arts such as: Fourier transform analysis, band-pass filtering, histogramming, edge detection, 1-D projections, segmentation, classification, artifact detection, FIR filtering, wavelet analysis, statistical analysis, pattern recognition, or the like, to evaluate image quality and/or identify defects. In one embodiment, the user/customer may also be prompted to input additional features describing the defect such as, for example, selecting one of a set of descriptive icons or exemplary images, or answering specific questions. In another embodiment, the image quality analysis and defect recognition are accomplished through the use of image processing and/or pattern recognition algorithms such as those described in copending U.S. patent application Ser. Nos. 09/450,185; 09/450,183; 09/450,182; 09/450,181; 09/450,180; and 19/450,177, incorporated herein by reference in their entirety.

In one embodiment, the output of the image quality analysis module 106 may include a list of print defects, detected or suspected, and their characteristics such as magnitude, frequency, at what colorant combination, locations etc. The list of print defects in the scanned printed image may include, but are not limited to, lines, bands, streaks, spots, mottle, halo, splatter, light images, dark images, blank images, deletions, background ink contamination, graininess, ghosting, skew, registration defects, color balance, color registration, color variation within a page, print-to-print variation, inboard-outboard variation, loss of a tone-reproduction, line width, edge width, line density, line edge, line shape, sharpness, contours, reload, pixel to pixel placement defects, and the like.

In one embodiment, the identified defects in the printed image are further analyzed to yield parameters for diagnosis, monitoring, and printer characterization/calibration. The system 100 is configured to automatically and dynamically generate test pattern image data based on the one or more defects identified by the image quality analysis module 106 and/or based on the inferred parameters. In one embodiment, the test patterns are dynamically generated based on the knowledge of image quality gathered from customer documents and/or diagnostic engines, as described in U.S. patent application Publication entitled "Systems and Methods for Implementing Use of Customer Documents in Maintaining Image Quality (IQ)/Image Quality Consistency (IQC) of Printing Devices", Ser. No. 12/109,203, filed on Apr. 24, 2008, incorporated herein by reference, may be applied to the present disclosure to convert the inferred parameters to a test pattern and a test pattern description.

The test pattern image data may include the test pattern with a plurality of test targets, and the test pattern description. In one embodiment, the test pattern may be in the form of a postscript file and the test pattern description may be in the form metadata. In one embodiment, the test pattern image data may also include an intended image quality analysis that needs to be performed.

The test patterns are well known and may consist of a uniform gray or single-color image or a series of uniform image segments at varying gray levels. In conventional systems, the test patterns may further be hardcopy originals. In accordance with aspects of the present disclosure, the test patterns include test targets that are dynamically assembled as original digital images. The test patterns are submitted to the document printing system and printed to provide system feedback data under varying circumstances, for example, with or without document feeder, enlarged or reduced, repetitive copies, and other steps which tend to isolate possible root causes of the defect or failure mode. In one embodiment, sensors 56 and 58 are used to scan the test pattern and send the scanned test pattern data to the image quality analysis module 106 for diagnostic purposes. Alternately, or in addition, the digital test patterns may be submitted as print jobs and printed using print engine 102.

In one embodiment, test pattern toner image may be applied on photoreceptor 110 by one or more lasers such as 14C, 14M, 14Y, and 14K. As would be appreciated by one skilled in the art of "laser printing," by coordinating the modulation of the various lasers such as 14C, 14M, 14Y, and 14K with the motion of photoreceptor 110 and other hardware (such as rotating mirrors, etc., not shown), the lasers discharge areas on photoreceptor 110 to create the desired test targets, particularly after these areas are developed by their respective development units 16C, 16M, 16Y, 16K.

The test pattern description is selected from the group consisting of layout of the test targets, size of the test targets, color combinations of the test targets, and location of the test targets. The dynamically generated test patterns are submitted to the monitoring, diagnosis, and printer characterization/calibration engines for printing, sensing, and further analyses.

In one embodiment, the generated test patterns may automatically be printed, perhaps during customer idle time, and may be scanned using a sensor. The scanned test pattern image data is analyzed to extract relevant metrics, such as macro-uniformity, banding, or mottle. The relevant image quality metrics thus extracted may be used in a variety of ways as will be explained in the discussions later.

The system 100, in one embodiment, may include the diagnostic engine that is configured to analyze the test pattern image data (e.g., generated test pattern) to obtain a diagnosis. This may involve the task of reasoning with the multiple sources of diagnostic/prognostic information and isolating the root cause for the failure, actual or impending. The diagnostic engine may be based on one or more of the following diagnostic/prognostic technologies, for example, model based diagnosis, discrete event systems diagnosis, bayesian networks, causal networks, neural networks, artificial intelligence, rule-based systems, expert systems, fuzzy logic analysis, and/or look-up tables. Therefore, based on the analysis of the test patterns output by the document printing system, the diagnostic engine determines the list of components that have failed, are suspected to have failed or estimated to fail.

The diagnostic engine outputs information pertaining to the operational status of the document printing system. In particular, the list includes, but is not limited to, status information about the system, a list of one or more failed components, information pertaining to components that are predicted to fail, or the like. These results are output and displayed locally on the user interface of the system and/or a local diagnostic server on the customer side and/or transmitted remotely to any entity needing the information, such as a customer service engineer, a manufacturer/service provider diagnostic server, a part supplier, or the like. Additionally, it is to be appreciated that the results of the diagnostic engine need not be limited to visual notifications, but can also include audio notifications or any means suitable to notify the appropriate party. Examples of such notification methods include notifications via e-mail, paging, cellular phones, a web page, or the like. Finally, the results of the diagnostic/prognostic analysis may also be stored in machine history logs and/or in one or more databases or servers (e.g., image quality database 108).

In one embodiment, the image quality metrics extracted by the diagnostic engine from the generated test patterns may be stored in onboard memory located in photocopiers, printers, and other reproduction and printing devices. The onboard memory may include non-volatile memory (NVM), such as magnetic and optical storage media and including removable disk systems, hard drives, and other storage media systems. Alternatively, the image quality metrics can be pushed back to manufacturer/service provider on a regular basis where the image quality metrics can be analyzed to identify trends and schedule preemptive service. The image quality metrics can also be used to provide some actionable diagnostic information to the customer (e.g. replacement of a customer replaceable unit (CRU)). Finally, it can be provided to a field service engineer (CSE) before he/she arrives for the next service call. In one embodiment, the results of the image quality analysis may also be combined with machine state data to further refine or augment the characterization, and/or diagnosis. The machine state data may be in the form of a non volatile memory data that is routinely tracked and stored. In another embodiment, the machine state data may in the form of an output of special diagnostic routines, for example, manufacturer/service provider exerciser routine that are initiated and run based on the results of the preliminary image quality analysis.

As noted earlier, the system 100 includes the repair module configured to determine a repair based on the diagnosis. In one embodiment, the repair module generally comprises memory, which contains a table of service or repair procedures correlated with specific malfunctions or errors (e.g., based on results of the image quality analysis performed on the test patterns) identified by the diagnostic engine. It may be advantageous to review the scheduled or periodic maintenance service procedures stored in the memory for the purpose of accelerating service to fix the malfunction. In addition, memory provides access to a system's maintenance and repair history to allow the replacement of parts where warranted. Repair procedures may be performed by the customer, system administrator, operator, certified service personnel, or the like. In one embodiment, the system 100 performs remote diagnosis, schedules a service call to remediate an image quality problem and/or recommends a customer repair action. Alternatively, the system 100 communicates with the document printing system to invoke any appropriate auto-repair procedure such as machine set-up procedures, color balancing, color calibration, placing the machine in a low productivity mode, etc. The results of the automated repair procedures, such as, for example, the machine parameters changed during a set-up procedure, are displayed on the user interface of the system, and/or a diagnostic server and/or transmitted remotely to a customer service engineer and, in addition, stored in the machine history logs. Upon completion of the customer or customer service engineer repair action, and/or an automatic repair sequence, the machine's operation is verified and, if correct, the diagnostic routine completed. In the case of customer repair, the customer is guided through a repair procedure. In addition, the system may be equipped with a security system that allows different classes of customers, such as the end-user, key operator, and system administrator different levels of access to perform repair actions. For example, the end-user may have access to replace consumables, but no access to run a color calibration routine, or adjust machine setpoints. The key operator may have access to run a calibration routine and replace consumables, but denied access to change set-point values in the systems internal memory. All users may on the other hand, have permissions to place a service call. Thus, the repair module is configured to determine the repair action based on the diagnosis and to communicate at least one of repair information to at least one customer, a parts request to an appropriate entity, a service request notification to a customer service engineer and an instruction to autonomous repair entity.

The system 100 includes an image quality database 108 to accumulate the identified defects across documents and store them until enough information can be extracted. The image quality analysis resulting from test patterns are used to update the image quality database 108.

Figure 2:
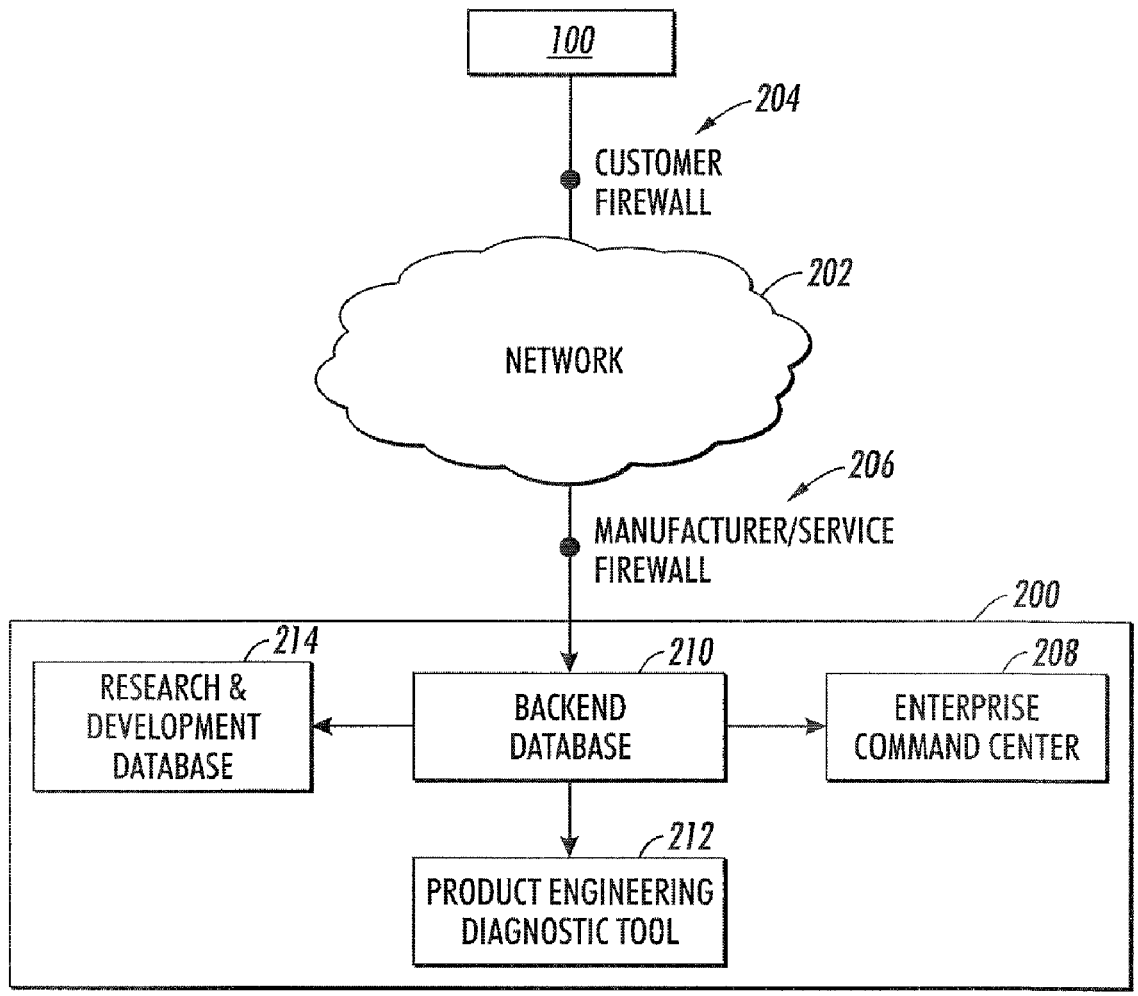
FIG. 2 shows the system for automated image quality based diagnosis of the document printing system being connected to a manufacturer/service provider through a network in accordance with an embodiment of the disclosure.

FIG. 2 shows an embodiment where the system 100 is connected to the manufacturer/service provider 200 via a network 202. A customer firewall 204 may be placed in between the system 100 and the network 202 and a manufacturer/service provider fire wall 206 may be placed between the manufacturer/service provider 200 and the network 202. In one embodiment, the image quality analysis trends from the image quality database 108 are periodically sent to manufacturer/service provider 202 via the network 202. In one embodiment, the image quality analysis trends from image quality database 108 are either sent individually or sent as part of the regular machine data push over a remote services framework such as device centric services (DCS) or call for assistance (CFA).

In one embodiment, the image quality metrics (e.g., the measure of banding and streak as perceived by human, Fourier coefficients) time series may be sent from the system 100 to the manufacturer/service provider 200 through the network 202. In another embodiment, image quality tests (e.g., in-board out-board uniformity, which refers to the uniformity/non-uniformity in a cross-processing direction of the print engine) and updated diagnostic tables may be sent from the manufacturer/service provider 200 to the system 100 through the network 202.

The image quality trend data that is periodically sent remotely to manufacturer/service provider 200 may be stored in a manufacturer/service provider database 210 (e.g., back-end database) and may used for a variety of other purposes. In one embodiment, the image quality trend data stored in the manufacturer/service provider database 210 may be sent to an enterprise command center 208, a product engineering diagnostic tool 212, and/or research and development database 214. In one embodiment, the image quality trend data may be entered into the enterprise command center 208 from the manufacturer/service provider database 210. The enterprise command center 208 is configured to keep track of the image quality trends of a plurality of identical document printing systems (e.g., fleet wide). The enterprise command center 208 may further assist in identifying any emerging image quality problems/issuer among the plurality of identical document printing systems (e.g., fleet wide).

In one embodiment, the image quality trend data may be entered into the product engineering diagnostic tool 212 from the manufacturer/service provider database 210. The image quality trend data in the product engineering diagnostic tool 212 may be used by product engineers to resolve third level escalation calls immediately without having to wait for actual print samples and/or test patterns to arrive from the customer. In one embodiment, the image quality trend data may be entered into the research and development database 214 from the manufacturer/service provider database 210. The trend data stored in the research and development database 214 may be used to infer data related to the customer usage of manufacturer/service provider's machines, and the level of image quality acceptance by the customers.

Also, the image quality trend data from the image quality database 108 may be made available to the field service engineer before he/she goes to service the customer machine. This will provide him/her with all the relevant information regarding the current image quality performance and speed up the service call. Furthermore, the image quality trend data may ensure that the engineer brings the right parts with him/her and avoid "broken" calls. The service call may be in response to a customer complaint or be a proactive manufacturer/service provider initiated call to preempt future customer calls.

Figure 3:
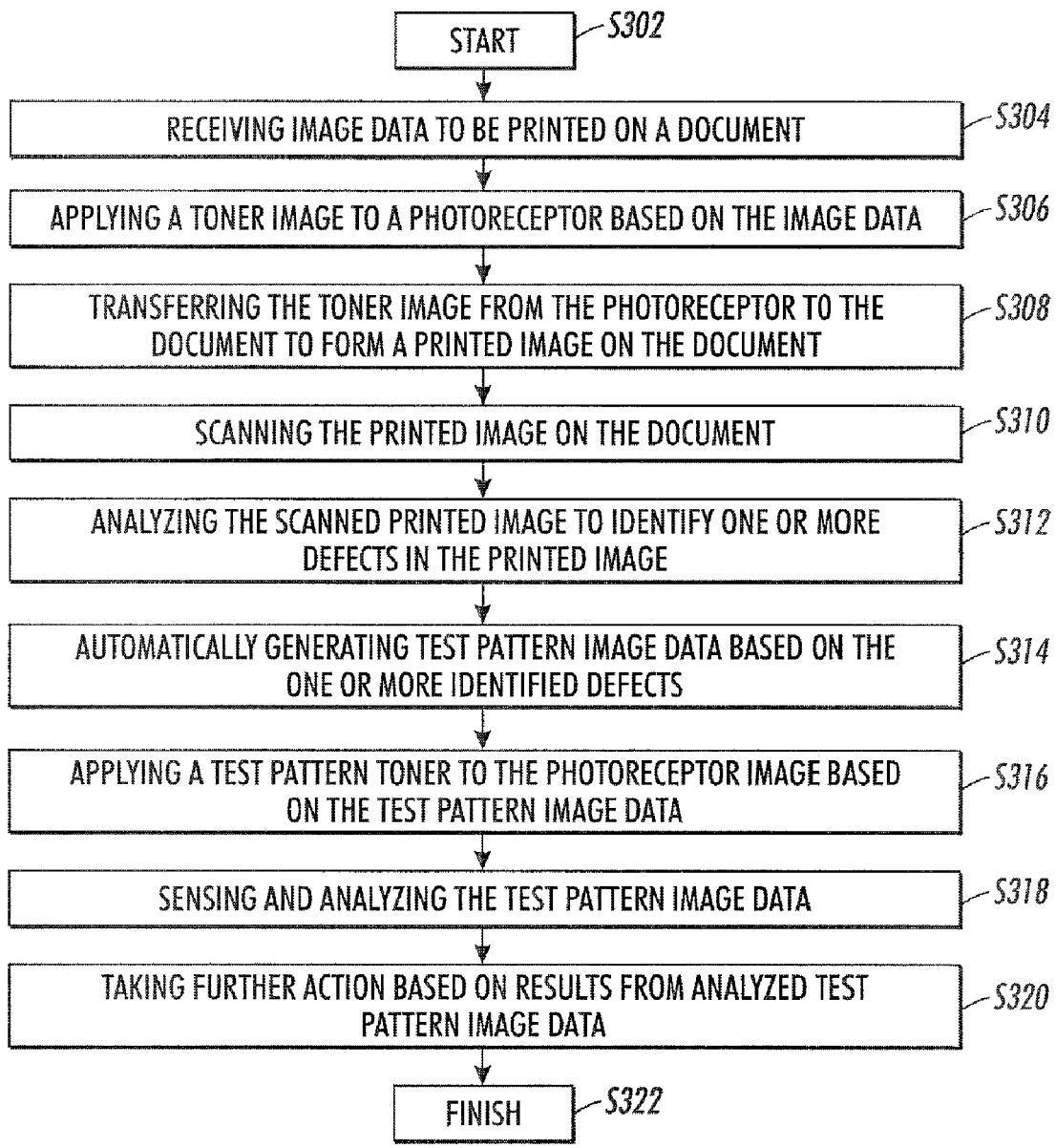
FIG. 3 shows a method for automated image quality based diagnosis of a document printing system in accordance with an embodiment of the disclosure.

FIG. 3 is a flowchart outlining an exemplary method according to one aspect of the disclosure. As shown in FIG. 3, the method begins in step S302. In step S304, image data (e.g., from customer documents or customer images) that needs to be printed on a document is received by the document printing system.

Next in step S306, a toner image is applied to the photoreceptor 110 based on the image data received in step S304. The toner image is applied to the photoreceptor 110 using the print engine 102. In step S308, the toner image from the photoreceptor 110 is transferred to the document to form a printed image on the document. In step S310, the printed image on the document is scanned using a sensor (e.g., a full-width linear array sensor 104). In step S312, the scanned printed image is analyzed by the image quality analysis module 106 to identify one or more defects in the printed image. In one embodiment, the identified defects in the printed image are further analyzed to yield parameters for diagnosis, monitoring, and printer characterization/calibration. Based on the inferred parameters and/or based on the one or more identified defects, in step 314, a test pattern image data generated. In step 316, a test pattern toner image is applied to the photoreceptor 110 based on the test pattern image data using the print engine 102. In step 318, the test pattern image data is scanned and analyzed. In step 320, further action(s) (e.g., repair) is taken based on results from the analyzed test pattern image data. Lastly, the method finishes in step S322.

Example

Figure 4:
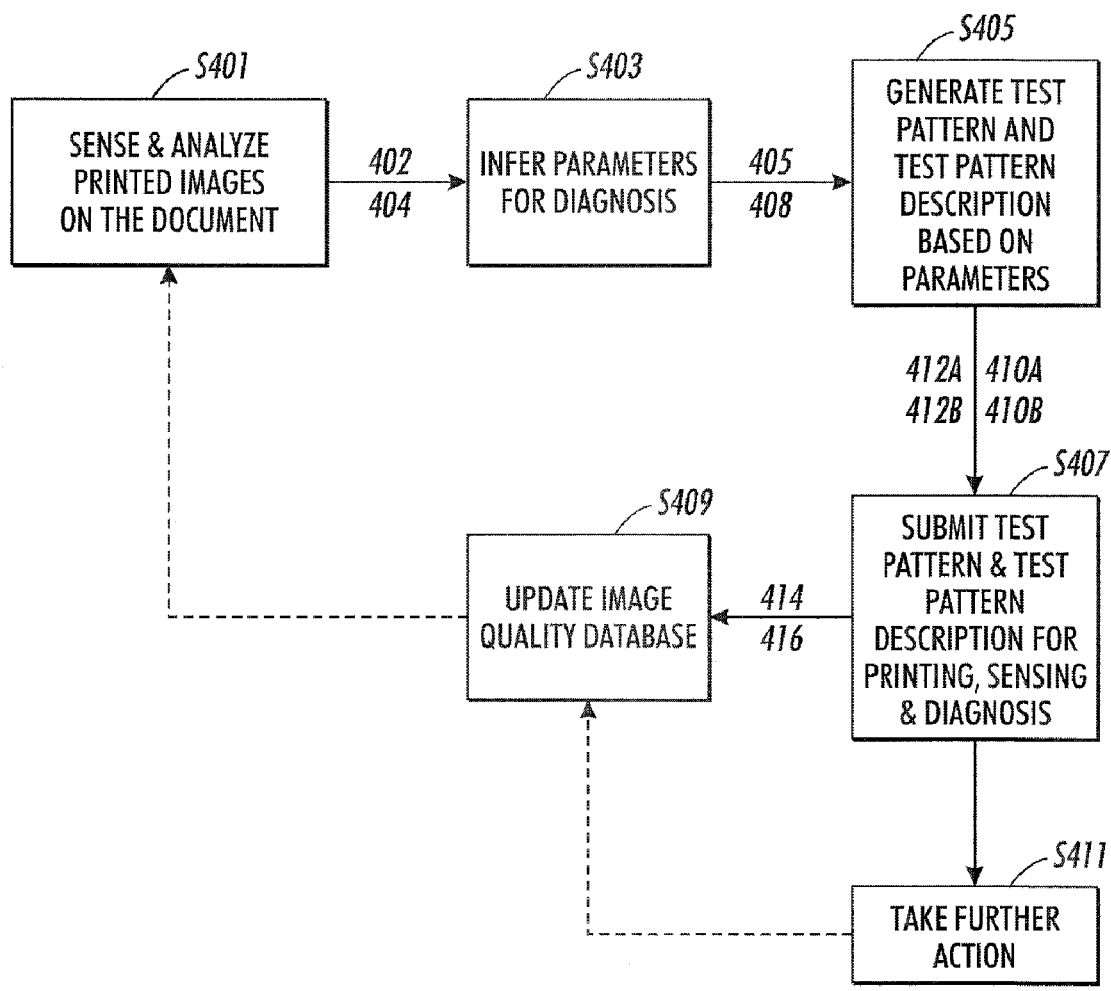
FIG. 4 shows a scenario of the method for automated image quality based diagnosis of a document printing system in accordance with an embodiment of the disclosure.

FIG. 4 illustrates an exemplary scenario of the method for automated image quality based diagnosis of a document printing system in accordance with an embodiment of the disclosure. For example, in one embodiment, the customer images or customer documents are scanned and analyzed to identify defects. These identified defects (e.g., dominant color errors observed in certain color combination and/or certain locations, banding frequency observed in certain colorant combination) detected from the customer images or customer documents are used to determine the optimal test patterns as will be discussed in detail below. In step S401, the printed image on the document is scanned and analyzed to identify defects 402 and/or 404 in the printed image. For example, two such identified defects 402 and 404 in the printed image may include a 2% error in 50% cyan; and 1 c/mm banding problem at 40% red (e.g., a combination of 40% magenta and 40% yellow) respectively. The unit for spatial frequency is cycle per millimeter (cycle/mm or c/mm). In step S403, the two identified defects 402 and 404 are analyzed further to infer parameters 406 and 408 respectively.

The inferred parameters 406 and 408 are used for diagnosis, monitoring, and printer calibration/characterization as explained below.

The parameter 406 for the defect 402 (i.e., a 2% error in 50% cyan) may include determining whether the error in cyan would affect the print engine performance on rendering pantone colors. In order to determine whether the error in cyan would affect the print engine performance on rendering pantone colors, the current pantone recipe is searched to find colors that use, for example, about 50% of cyan. Since the cyan errors were observed at about 50% cyan, the colors that use about 50% cyan are searched in the current pantone recipe. The searched colors are then extracted, printed and measured to validate or assess the impact of the cyan error. In step S405, the parameter 406 may be used for generating a test pattern 410A and a test pattern description 410B. In one embodiment, the test pattern 410A may be in the form of a postscript file and the test pattern description 410B may be in the form metadata. In one embodiment, the test pattern 410A may include all pantone patches having cyan between 40~60%. In step S407, the test pattern 410A and test pattern description 410B may be submitted for printing, sensing and diagnosis. When it is determined that the error in cyan would affect the print engine performance on rendering pantone colors, at step S411, a system such as an Automated Spot Color Editor (ASCE) may be activated to recalibrate the pantone recipe on the affected entries. The image quality measured 414 (e.g., actual color errors on the printed pantone color patches) on the test pattern 410A are sent to and stored in the image quality database in step S409. The method may then return to S401 after updating the image quality database. In one embodiment, the method may update the image quality database after activating the automated spot color editor.

The parameter 408 for the defect 404 (i.e., 1 c/mm banding problem at 40% red) may include determining whether the banding problems on magenta and yellow are out of specification. In order to determine whether the banding problems on magenta and yellow are out of specification, the banding performance of colorants that make up red color (i.e., magenta and yellow) need to be assessed. Since the banding frequency of interest is approximately 1 c/mm, a target having a length of slightly more than 20 mm along the banding direction and a width (e.g., depending on the printer noise) of slightly more than 10 mm perpendicular to the banding direction would be sufficient. It would be appreciated by one skilled in the art that it is relatively easy to measure the amplitude and frequency of a high frequency banding accurately with a target of this size. In step S405, the parameter 408 may be used for generating a test pattern 412A and test pattern description 412B. As noted above, in one embodiment, the test pattern 412A may be in the form of a postscript file and the test pattern description 412B may be in the form metadata. In one embodiment, the test pattern 412A may include a 20 mm stripe of 50% magenta having at least a width of 10 mm, and a 20 mm stripe of 50% yellow having at least a width of 10 mm. In this embodiment, 50% color is used rather than 40% color because the banding performance generally appears to be worse near mid-tone area, however, if desired 40% color may be used instead of 50% color. In step S407, the test pattern 412A and test pattern description 412B may be submitted for printing, sensing and diagnosis. When it is determined that the banding problems on magenta and yellow are out of specification, at step S411, a banding compensation technology may be initiated to improve the banding performance. The image quality measured 416 (e.g., the actual banding amplitude and frequency of 50% magenta and 505 yellow) on the test pattern 412A are sent to and stored in the image quality database in step S409. The method may then return to S401 after updating the image quality database. In one embodiment, the method may update the image quality database after initiating the band compensation technology.

In contrast, when the same scenario as discussed above occurs in a system that does not use the automated image quality based diagnosis described in the present disclosure, then the diagnosis of image quality in such as system is explained below. A customer who is not satisfied with the print quality of his/her printer contacts the manufacturer/service provider. In response, a field engineer is dispatched to the customer site to resolve the image quality problem. The engineer does not have any prior knowledge about the nature of the problem, except for a brief description provided by the customer. The engineer would need to print and measure all of the pantone colors to resolve the defect 402. The engineer may also need to print and measure full-page (215.9 mm×279.4 mm) 50% cyan, 50% magenta, 50% yellow, 50% black patterns in order to address the banding problem 404. The engineer may print and measure several documents of test-patterns, whereas the same may be achieved by printing less than a letter size (215.9 mm×279.4 mm) document using the present disclosure. Additionally, the field engineer may not have all the parts that are needed to fix the problem readily available, which may further increase the overall service time. On the other hand, with the present disclosure, the engineer can arrive with the right parts selected based on the information communicated to the engineer remotely by the automated image quality diagnosis system. Therefore, as noted earlier, the present disclosure effectively reduces the number of test patterns to be printed, and improves the efficiency of the analysis on test patterns while sustaining the quality of diagnosis. The system may also potentially reduce service costs by providing more detailed information about the image quality defects to a field service engineer, and by providing proactive intervention prior to image quality complaints from the customer.

In one embodiment, the components of the system 100 for automated image quality based diagnosis may be independent functional modules (e.g., image quality analysis module, repair module). In another embodiment, however, it should be understood that related functions can be implemented by a Central Processor Unit (CPU) incorporating algorithms for initiating and controlling various functions to implement the features associated with the functional modules. In addition, it should be appreciated that any one of, or a portion of the components of the system 100 for automated image quality based diagnosis can be repositioned elsewhere, for instance, on a distributed network or on a remote diagnostic system. The flexibility of location could be implemented through the use of wired or wireless links or any other known or later developed elements capable of providing data to and from one or more of the functional modules.

In one embodiment, the components of document processing system are operationally interconnected by means of a system bus, not shown, connected to the system 100 for automated image quality based diagnosis by connecting network. Furthermore, connecting network can be any one of or combination of a system bus, a serial or parallel connection, a distributed or local area network such as an intranet, a metropolitan area network, a wide-area network, a satellite communication network, an infrared communication network, the Internet, or the like.

Although, the system 100 operates in association with document printing system, shown in FIG. 1, and can be part of a document processor, multifunction machine, printer, etc. as noted earlier. Alternatively, system for automated image quality based diagnosis may generally be a computer connected to the machine, or could be implemented as a stand alone appliance having appropriate plug-in capability for operation with a variety of machines in many different environments. In particular, the system for automated image quality based diagnosis may preferably be implemented either on a single program general purpose computer or separate program general purpose computer. In one embodiment, the system for automated image quality based diagnosis may also be implemented on a special purpose computer, a programmed microprocessor or microcontroller and peripheral integrated circuit element, an ASIC, or other integrated circuit, a digital signal processor, a hard-wired electronic or logic circuit such as a discreet element circuit, a programmable logic device such as a PLD, PLA, FPGA, PAL, or the like.

While this disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the disclosure following, in general, the principles of the disclosure and including such departures from the present disclosure as come within known or customary practice in the art to which the disclosure pertains, and as may be applied to the essential features hereinbefore set forth and followed in the spirit and scope of the appended claims.

What is claimed is:

1. A method for automated image quality based diagnosis of a document printing system, the method comprising:
   receiving image data to be printed on a document;
   printing an image on the document based on the image data;
   scanning the printed image on the document with a sensor;
   analyzing the scanned printed image with an image quality analysis module to identify one or more defects in the printed image;
   automatically generating test pattern image data based on the one or more identified defects; and
   printing and analyzing a test pattern image based on the test pattern image data.

2. The method of claim 1, wherein printing the image on the document comprises applying a toner image to a photoreceptor based on the image data using a print engine, and transferring the toner image from the photoreceptor to the document to form the printed image on the document.

3. The method of claim 2, wherein printing the test pattern image comprises applying a test pattern toner image to the photoreceptor based on the test pattern image data using the print engine and transferring the test pattern toner image from the photoreceptor to form the test pattern image.

4. The method of claim 1, wherein analyzing the test pattern image to obtain an initial diagnosis using a diagnostic engine, wherein initial diagnosis is refined or augmented by the diagnostic engine by combining the initial diagnosis with machine state data.

5. The method of claim 4, wherein the machine state data is a nonvolatile memory data that is routinely tracked and stored, or an output of special diagnostic routines that are initiated and run based on the initial diagnosis.

6. The method of claim 1, wherein the sensor is a full width array (FWA) sensor, contact image sensor, a CMOS array sensor or a CCD array sensor.

7. The method of claim 1, further comprising storing analyzed test pattern image data in an image quality database.

8. The method of claim 1, wherein the test pattern image data includes a test pattern with a plurality of test targets, and a test pattern description.

9. The method of claim 8, wherein the test pattern description is selected from the group consisting of layout of the test targets, size of the test targets, color combinations of the test targets, and location of the test targets.

10. The method of claim 4, further comprising determining a repair action by the repair module based on the diagnosis, wherein the repair module is configured to communicate at least one of repair information to at least one customer, a parts request to an appropriate entity, a service request notification to a customer service engineer and an instruction to autonomous repair entity.

11. The method of claim 1, further comprising collecting and analyzing image quality data, obtained by analyzing the test pattern image, from a plurality of identical document printing systems to identify any potential image quality problems among the identical document printing systems.

12. The method of claim 1, wherein data obtained from the printed image is used to determine an optimal test pattern.

13. A system for automated image quality based diagnosis of a document printing system, comprising:
   a print engine configured:
      to receive image data to be printed on a document, and
      to print an image on the document based on the image data;
   a sensor configured to scan the printed image; and
   an image quality analysis module configured to analyze the scanned printed image to identify one or more defects on the printed image;
   wherein the print engine is configured:
      to automatically generate test pattern image data based on the one or more identified defects, and
      to print and analyze a test pattern image based on the test pattern image data.

14. The system of claim 13, wherein the print engine is configured to apply a toner image to a photoreceptor based on the image data and to transfer the toner image from the photoreceptor to the document so as to form the printed image on the document.

15. The system of claim 14, wherein the print engine is configured to apply a test pattern toner image to the photoreceptor based on the test pattern image data and to transfer the test pattern toner image from the photoreceptor so as to form the test pattern image.

16. The system of claim 13, further comprising a diagnostic engine configured to analyze the test pattern toner image on the photoreceptor to obtain an initial diagnosis, wherein initial diagnosis is refined by the diagnostic engine by combining the initial diagnosis with machine state data.

17. The system of claim 16, wherein the machine state data is a nonvolatile memory data that is routinely tracked and stored, or an output of special diagnostic routines that are initiated and run based on the initial diagnosis.

18. The system of claim 13, wherein the sensor is a full width array (FWA) sensor, contact image sensor, a CMOS array sensor or a CCD array sensor.

19. The system of claim 13, further comprising an image quality database configured to store analyzed test pattern image data.

20. The system of claim 13, wherein the test pattern image data includes a test pattern with a plurality of test targets and a test pattern description.

21. The system of claim 20, wherein the test pattern description is selected from the group consisting of layout of the test targets, size of the test targets, color combinations of the test targets, and location of the test targets.

22. The system of claim 16, further comprising a repair module configured to determine a repair action based on the diagnosis, wherein the repair module is configured to communicate at least one of repair information to at least one customer, a parts request to an appropriate entity, a service request notification to a customer service engineer and an instruction to autonomous repair entity.

23. The system of claim 13, wherein image quality data, obtained by analyzing the test pattern image, is collected from a plurality of identical document printing systems and is analyzed to identify any potential image quality problems among the identical document printing systems.

24. The system of claim 13, wherein data obtained from the printed image is used to determine an optimal test pattern.

25. The system of claim 13, wherein image data comprises data received from a customer.

26. A system for pooling image quality data related to a plurality of document printing systems to obtain automated image quality based diagnosis, comprising:
 a plurality of document printing systems, each document printing system comprises:
  a print engine configured
   to receive image data to be printed on a document, and
   to print an image on the document based on the image data;
  a sensor configured to scan the printed image;
  an image quality analysis module configured to analyze the scanned printed image to identify one or more defects on the printed image;
  wherein
  the print engine is configured
   to automatically generate test pattern image based on the one or more identified defects; and
   to print and analyze a test pattern image based on the test pattern image data;
 a network; and
 a manufacturer/service provider;
 wherein
 an image quality data is obtained from at least one document printing system by analyzing the test pattern image from the at least one document printing system; and
 the manufacturer/service provider is configured to receive the image quality data from the at least one document printing system via the network.

27. The system of claim 26, wherein image quality metrics are transferred from the at least one document printing system to the manufacturer/service provider.

28. The system of claim 26, wherein image quality tests and updated diagnostic tables are transferred from the manufacturer/service provider to the at least one document printing system.

* * * * *